United States Patent [19]
Weber et al.

[11] Patent Number: 5,603,249
[45] Date of Patent: Feb. 18, 1997

[54] TRIM CUTTER APPARATUS FOR BLOW MOLDED ARTICLES

[75] Inventors: Lawrence H. Weber, Ypsilanti, Mich.; James M. Sheely, Toledo, Ohio

[73] Assignee: R & B Machine Tool Company, Saline, Mich.

[21] Appl. No.: 425,104

[22] Filed: Apr. 19, 1995

[51] Int. Cl.$^6$ ............................. B23B 5/16; B23B 15/00
[52] U.S. Cl. ............................. 82/52; 83/914; 425/531; 82/59
[58] Field of Search .......................... 82/46, 52, 59, 82/61, 71–72, 80, 88; 83/100, 914; 408/58; 409/137; 425/527, 531

[56] References Cited

U.S. PATENT DOCUMENTS

| | | | |
|---|---|---|---|
| 4,911,253 | 3/1990 | Cliche | 408/58 |
| 4,919,607 | 4/1990 | Martin et al. | 425/531 |
| 4,998,873 | 3/1991 | Martin et al. | 425/541 |
| 5,419,224 | 5/1995 | Gamperling et al. | 83/100 |

FOREIGN PATENT DOCUMENTS

102602  6/1983  Japan ............................. 82/52

*Primary Examiner*—M. Rachuba
*Assistant Examiner*—Kenneth J. Hansen
*Attorney, Agent, or Firm*—Reising, Ethington, Barnard & Perry

[57] ABSTRACT

A head trimmer machine for cutting off excess material from a cylindrical portion of a blow molded bottle includes a fixture, a spindle rotatably mounted in the fixture, a cutting head attached to the spindle for rotation therewith, a cutter mounted to the cutting head, and a vacuum source for collecting the trimmed material by suction. The cutting head has a central passage so that it can fit down over the head of the blow molded bottle. The cutter is supported in the cutting head for movement between retracted and extended positions. In the extended position, the cutter extends into the central passage of the cutting head to cut the head or other excess material from the neck of the bottle as the cutting head turns. The spindle includes a central passage aligned with the central passage of the cutting head and the excess material is removed by being drawn through these passages by a gaseous flow created by the vacuum source. Movement of the cutter can be pneumatically controlled by a pair of air pistons located on the cutting head, with the air pistons receiving pneumatic control signals from an outside source via rotational pneumatic couplings between the fixture and spindle.

8 Claims, 5 Drawing Sheets

TRIM CUTTER APPARATUS FOR BLOW MOLDED ARTICLES

TECHNICAL FIELD

The present invention relates generally to apparatus used in trimming excess material from cylindrical portions of blow molded articles and, in particular, to a head trimming machine for cutting off dome heads from plastic blow molded bottles.

BACKGROUND OF THE INVENTION

Plastic bottles and other articles made by blow molding are formed from a tubular section of parison which is extruded from a die and then clamped between a pair of mold sections. The bottom of the parison is squeezed together by the two mold sections and, as a result, is sealed together to form a closed bottom of the bottle. The top of the parison becomes the neck of the bottle and is typically kept open to allow for insertion of a blow pin. After the bottle has been formed and cured, the mold sections are separated and the bottle either drops under the force of gravity into a receptacle or is removed by a take-off mechanism. U.S. Pat. No. 4,998,873, issued Mar. 12, 1991 to M. W. Martin et al. describes the construction and operation of an indexable blow molding machine suitable for carrying out this process.

Once the bottle has been removed from the mold, excess material located at the mouth of the bottle must be cut away and removed for disposal or recycling. Since many of the articles produced by blow molding are used in the food industry to store beverages and other foodstuffs, it is particularly important that the excess material be cut away and removed without it or fragments of it falling into the bottle.

The excess material at the mouth of the bottle can be formed during the blow molding process into a predetermined shape that remains attached to the neck of the bottle. Sometimes the excess material is formed into a conical (dome) or other rotationally symmetrical shape so that so that an oscillating cutter head can be used to trim the excess material from the bottle. In a known prior art cutting machine, the cutter head includes a cutter that is brought into contact with the neck of the bottle while the cutter head rotates through 360° to trim the excess material, which then falls away under the force of gravity. Rotation is controlled by a rotary actuator with the direction of rotation being reversed for each successive bottle due to the reciprocation of the rotary actuator.

SUMMARY OF THE INVENTION

The present invention provides a method and apparatus for cutting excess material from a cylindrical end of a blow-molded article. The apparatus includes a fixture, a cylindrical spindle rotatably mounted to the fixture, a cutting head, a cutter mounted on the cutting head, a mechanism for moving the cutter into contact with the article, and a vacuum (low pressure) source. The spindle has first and second axial ends and a central bore extending through the spindle from openings at the first and second ends. The cutting head has proximal and distal axial ends with the proximal end rigidly connected to the second end of the spindle so that the cutting head rotates with the spindle. The cutting head also has a central passage that opens to the central bore of the spindle at the proximal end and that terminates in a distal opening at the distal end. The cutter is movable between a retracted position and an extended position in which the cutter extends into the central passage. The apparatus can utilize one or more pneumatically driven air pistons located in the cutting head to move the cutter between its retracted and extended positions. The vacuum source is coupled to the first end of the spindle to draw air through the central passage of the cutting head and the central bore of the spindle. Excess material cut from the article can then be drawn through the cutting head and spindle for disposal or recycling.

The method of the present invention includes the steps of moving a cutting head having a cutter mounted therein over the cylindrical portion of the article, rotating the cutting head with respect to the article and simultaneously moving the cutter into contact with the article to separate the excess material from the article, and then drawing the excess material through the cutting head using a gaseous flow.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
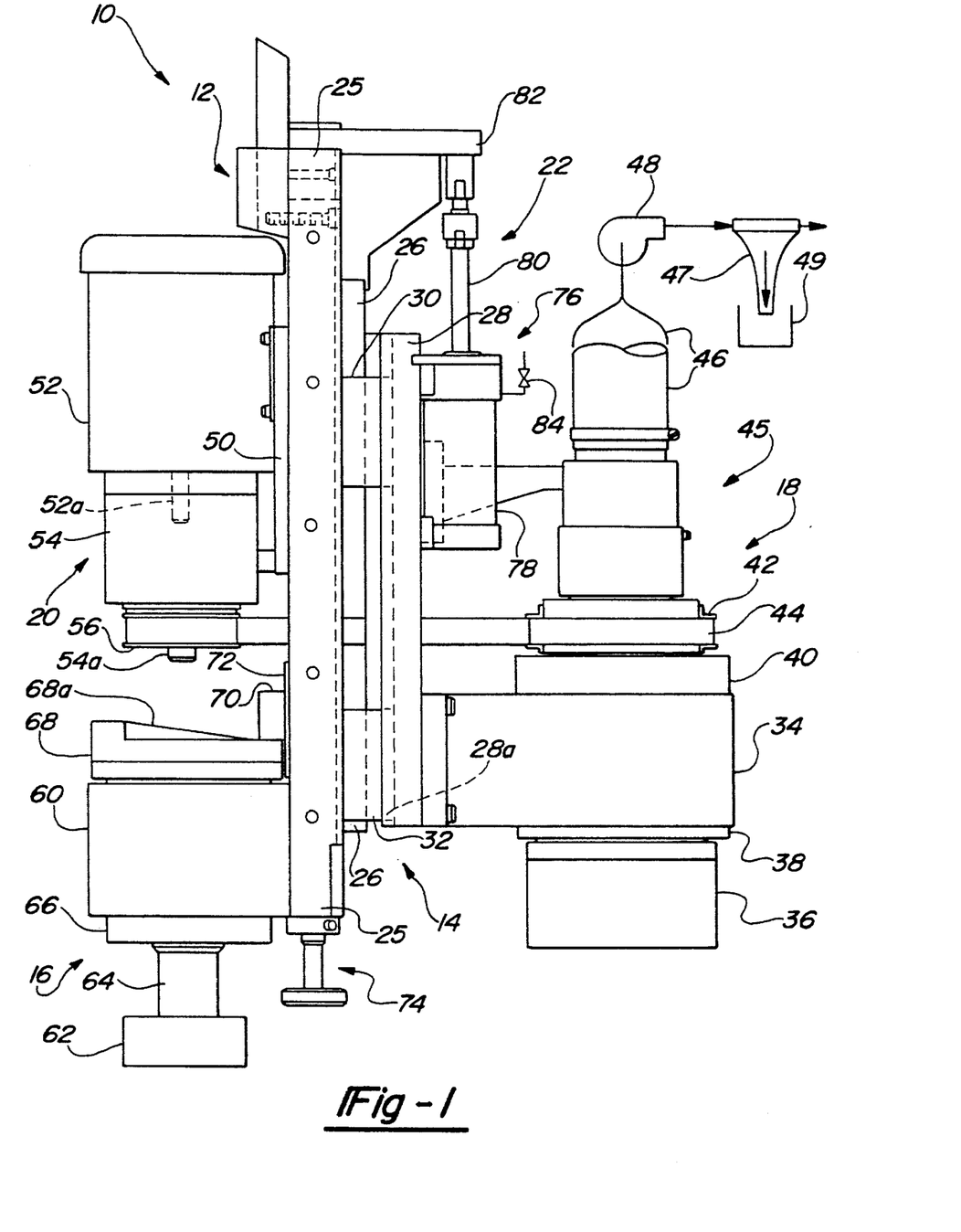
FIG. 1 is partially a side view and partially a diagrammatic view of a head trimming machine constructed in accordance with the present invention.

FIG. 1 depicts a preferred embodiment of a head trimming machine 10 of the invention. In general, trimming machine 10 has a frame 12, a carriage 14 that is vertically positionable on frame 12, a cammed lifting assembly 16 that is supported on frame 12, a cutting assembly 18 and a spindle drive assembly 20 that are both attached to carriage 14, a counterbalancing assembly 22 connected between frame 12 and carriage 14, and a vacuum system 24 connected to cutting assembly 18. Frame 12, vacuum system 24, and the non-rotatable components of cammed lifting assembly 16 are all stationary. Carriage 14 is vertically reciprocated under the control of cammed lifting assembly 16 to lower and raise cutting assembly 18 into and out of engagement with blow molded articles that are shuttled into and out of position under cutting assembly 18 by a suitable conveyor system (not shown). As will be described in greater detail below, cutting assembly 18 trims excess material from the neck of the blow molded articles by rotating a cutting blade around the neck of the bottle. The excess material is removed by vacuum system 24 using suction to pull the excess material up through cutting assembly 18. The rotation of the cutting blade is provided by spindle drive assembly 20, which is also mounted on carriage 14. Counterbalancing assembly 22 is a pneumatic system that provides the bulk of the energy needed to raise carriage 14 and the assemblies it supports so that the weight of those assemblies is not borne entirely by cammed lifting assembly 16.

Frame 12 has a vertically extending stationary mount 25, a portion of which is shown cut away to provide a view of the structure located behind frame 12. Attached to frame 12 along its vertical length is a guide rail 26 along which carriage 14 moves. Carriage 14 includes a vertically oriented, rectangular platen 28 to which is mounted cutting assembly 18 and spindle drive assembly 20. Platen 28 includes a recessed channel 28a into which a pair of platen guides 30, 32 are attached. Guides 30, 32 each have two parallel upstanding walls (only one shown for each) that form a channel within which guide rail 26 is located. Thus, as carriage 14 moves vertically, platen guides 30, 32 slide along guide rail 26.

Cutting assembly 18 is connected to platen 28 by a fixture 34 that forms a housing within which the rotating elements of cutting assembly 18 are mounted. In general, cutting assembly 18 includes a cutting head 36, a lower labyrinth seal 38, an upper labyrinth seal 40, a pulley 42 driven by a timing belt 44 from spindle drive assembly 20, and a vacuum supply coupling 45. Rotation of pulley 42 via belt 44 causes concomitant rotation of a spindle within housing 34 which, in turn, causes rotation of cutting head 36. The construction and operation of these elements are described below in greater detail in connection with FIGS. 2 and 3.

Vacuum system 24 includes a vacuum supply coupling 45, a vacuum hose 46, a cyclone 47, and a vacuum source or blower 48. Blower 48 is connected to cutter assembly 18 via vacuum hose 46 and coupling 45. When blower 48 is operated, it pulls air through cutting assembly 18, coupling 45, and vacuum hose 46 and then forces that air through cyclone 47. The suction provided by blower 48 is sufficient to draw any excess material trimmed from the blow-molded article along with the air. The excess material is forced along with the air stream through blower 48 and into cyclone 47 where the excess material falls into a receptacle 49. Suitable arrangements of blower 48 and cyclone 47 to move and separate the excess material from the air stream will be apparent to those skilled in the art. The construction of vacuum supply coupling 45 will be described in greater detail in connection with FIG. 2.

Spindle drive assembly 20 is connected to platen 28 by a connecting bracket 50, a portion of which is shown in FIG. 1. Spindle drive assembly 20 includes a drive motor 52 having a driven shaft 52a connected to a geared speed reducer 54 that rotates a drive pulley 56 via an output shaft 54a at a speed of 350 rpm. The ratio of the diameter of drive pulley 56 to driven pulley 42 is approximately 0.58, resulting in cutting head 36 having a rotational speed of slightly over 200 rpm.

Cammed lifting assembly 16 is supported from frame 12 by a bearing support housing 60. Lifting assembly 16 includes a low speed drive 62 that rotates a vertically disposed shaft 64. Drive 62 can be implemented in any of a number of ways that will be apparent to those skilled in the art. Shaft 64 is supported by a pair of tapered roller bearings (not shown) mounted within support housing 60 and protected by an annular seal 66. Connected to the upper end of shaft 64 is a cam plate 68 having an annular, ramped cam track 68a on its upper side. Sitting on cam track 68a is a cam follower 70 which is journaled to a bracket 72 that is rigidly attached to platen 28. Thus, rotation of shaft 64 under the power of drive 62 causes cam plate 68 to rotate and cam follower 70 to ramp up on a first portion of cam track 68a, resulting in carriage 14 (and the assemblies attached thereto) rising upwardly. Continued rotation of shaft 64 results in cam follower 70 rolling down a second portion of cam track 68a with carriage 14 thereby moving downwardly. As will be appreciated, carriage 14 is at its lowest selectable position when cam follower 70 is at the bottom of the ramp of cam track 68a. Fine upward adjustments of the bottom position of carriage 14 from this lowest position can be made manually using a threaded stop 74 that is attached to frame 12 and that engages a rest button (not shown) located on the lower end of carriage 14.

Counterbalancing assembly 22 includes a pneumatically driven air cylinder 76 having a casing 78 mounted on platen 28 and a rod 80 connected to a support bracket 82 that is mounted on frame 12. Pneumatic control of air cylinder 76 is provided by an air valve 84. Air valve 84 is connected to a source of compressed air (not shown) and is used to release pressurized air into and out of air cylinder 76. Air cylinder 76 includes an internal piston that is connected to rod 80 and that tends to pull rod 80 into casing 78 under the force of compressed air entering air cylinder 76 when valve 84 is open. Since rod 80 is rigidly connected to frame 12 via bracket 82, it is stationary and compressed air entering air cylinder 76 will therefore tend to lift casing 78 and, therefore, carriage 14. In this way, air cylinder 76 can be used to support the bulk of the weight of carriage 14, cutting assembly 18, and spindle drive assembly 20. When drive 62 is rotated so as to lower carriage 14, excess air is bled off from within cylinder 76 so that cam follower 70 maintains contact with cam track 68a. Adjustment of air pressure to valve 84 in coordination with the operation of reversible drive 62 provides the proper counterbalancing force at all points along the range of vertical motion of carriage 14.

Figure 2:
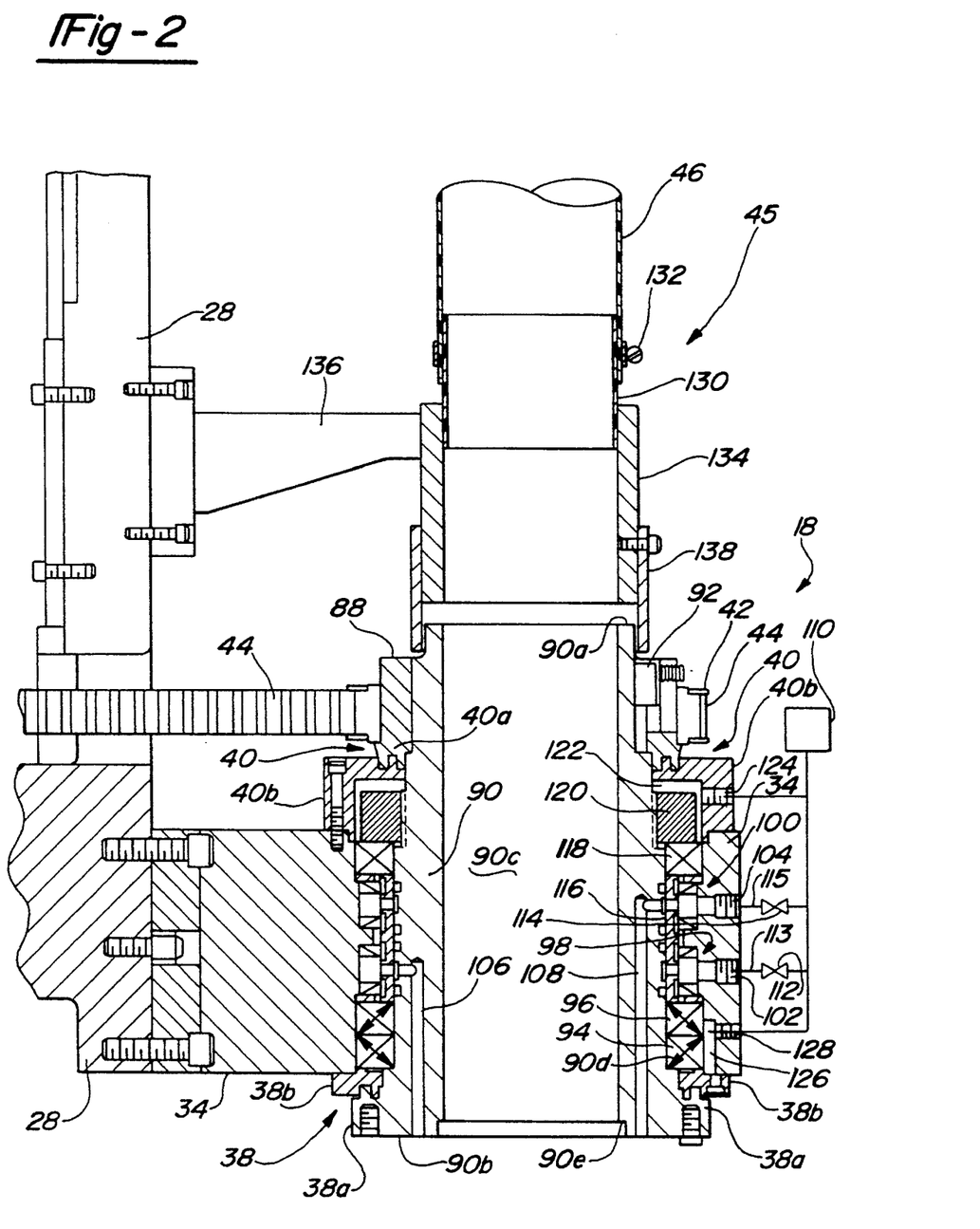
FIG. 2 is a partial cross-sectional view of the rotational mount and seals for the cutting assembly of the head trimming machine of FIG. 1 and it includes a schematic representation of a pneumatic source and valves for supplying compressed air to the cutting assembly.

Turning now to FIG. 2, a cross-sectional view of cutting assembly 18 is shown from the same, side viewing perspective used in FIG. 1. In general, housing 34 supports a spindle 90 that is secured for rotation with pulley 42. Spindle 90 has an upper axial end 90a, a lower axial end 90b, and a central bore 90c that extends between axial ends 90a and 90b. Spindle 90 and pulley 42 are secured to an annulus 88 that includes a unitary first upper seal section 40a of upper labyrinth seal 40, with spindle 90 being connected to rotate with upper seal section 40a by a key 92. A second upper seal section 40b is attached to housing 34 and supports spindle 90 and pulley 42 by way of seal section 40a. The lower end of spindle 90 is retained in place by lower labyrinth seal 38, with spindle 90 forming a first lower seal section 38a which mates with a second lower seal section 38b that is secured to housing 34.

Above lower labyrinth seal 38 are two coaxial contact bearings 94 and 96, with bearing 94 being supported on its underside by second lower seal section 38b and a shoulder 90d of spindle 90. Above these bearings are a pair of rotational pneumatic couplings 98 and 100 that permit the passage of compressed air from a pair of respective pneumatic feeds 102 and 104 located in housing 34 to a pair of respective internal passages 106 and 108 within spindle 90. Passages 106 and 108 are used to supply compressed air to cutting head 36 for the purpose of controlling movement of a cutting blade, as will be discussed below in conjunction with FIGS. 4 through 7. The source of compressed air originates at a pneumatic supply 110. A first electronically operated flow control valve 112 receives compressed air from pneumatic supply 110 and selectively provides the compressed air to pneumatic feed 102 via a first conduit 113. Similarly, a second electronically operated flow control valve 114 receives compressed air from pneumatic supply 110 and selectively provides the compressed air to pneumatic feed 104 via a second conduit 115. Pneumatic couplings 98 and 100 include a single shared sleeve 116 rotating with spindle 90. The construction of pneumatic couplings 98 and 100, including sleeve 116 is described below in connection with FIG. 3. Above pneumatic couplings 98 and 100 is a ball bearing 118. A locking nut 120 is used to hold bearings 94, 96, and 118 and pneumatic couplings 98 and 100 stacked against shoulder 90d and seal section 38b.

Locking nut 120 and second upper seal section 40b together define an air cavity 122 that is in open communication with an upper purge port 124 formed in second upper seal section 40b. Purge port 124 is connected to receive compressed air from pneumatic supply 110. A small air gap exists between first and second seal sections 40a and 40b of upper labyrinth seal 40 and the flow of air through that air gap prevents dust and grit from accumulating within seal 40 and creating wear on the opposing surfaces of seal 40. A similar cavity 126 exists between housing 34, contact bearing 94, and seal section 38b which is fed by a lower purge port 128 to provide a continuous flow of air through labyrinth seal 38.

With continued reference to FIG. 2, vacuum supply coupling 45 will now be described. Vacuum hose 46 is connected to one end of a connector 130 using a hose clamp 132. The other end of connector 130 is pressed within a metal cylindrical housing 134 that is attached to platen 28 via a bracket 136. Bolted to housing 134 is a cylindrical sleeve 138 that fits down over axial end 90a of spindle 90. Thus, spindle 90, sleeve 138, housing 134, connector 130, and hose 46 together define an airflow passage extending from axial end 90b of spindle 90 to vacuum supply 48. Sleeve 138 has an inside diameter that is slightly greater than the outside diameter of axial end 90a so that it can extend over axial end 90a without any contact therebetween. In this way, spindle 90 is free to rotate and the amount of air entering the airflow passage between spindle 90 and sleeve 138 is small enough not to adversely affect the suction provided by vacuum source 48.

Figure 3:
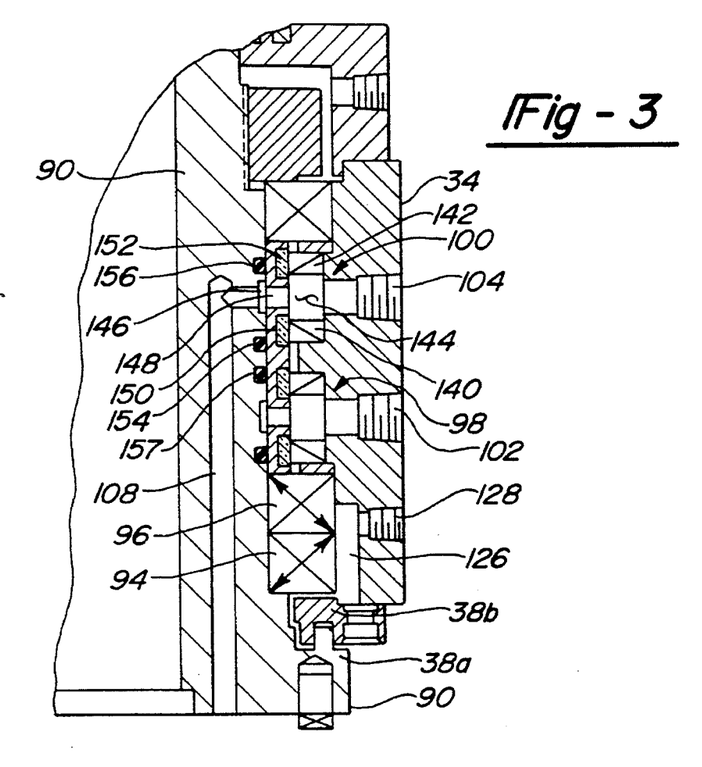
FIG. 3 is an enlarged, partial view of the cross-section depicted in FIG. 2 showing details of the construction of the rotational pneumatic couplings and seals.

Referring now to FIG. 3, certain details of pneumatic coupling 100 will be described and it will be understood that these details apply equally to the construction of pneumatic coupling 98. Pneumatic coupling 100 includes a pair of air seals 140 and 142 that mate with sleeve 116 which, as mentioned above, is connected to spindle 90 for rotation therewith. Air seals 140 and 142 are located on either side of pneumatic feed 104 and define a circumferential cavity 144 that extends around sleeve 116. Spindle 90 includes a circumferential groove 146 located opposite cavity 144. Sleeve 116 contains four radial passages 148 (one shown) disposed ninety degrees apart about the circumference of sleeve 116. Thus, it will be appreciated that compressed air within circumferential cavity 144 can flow through passages 148 in sleeve 116 and into the cavity defined by circumferential groove 146 regardless of the rotational position of any of the passages 148. Internal passage 108 within spindle 90 opens into groove 146, allowing the compressed air to flow through passage 108 and down to cutting head 36 to control the cutting blade located therein.

Air seals 140 and 142 mate with respective chromium oxide surfaces 150 and 152 formed in a pair of respective circumferential channels located in sleeve 116. The contact between air seals 140 and 142 and chromium oxide surfaces 150 and 152, respectively, allow sleeve 116 to rotate with respect to seals 140 and 142 while maintaining an air tight connection, even at the pneumatic pressures needed to activate the cutting blade used in cutting head 36. Although sleeve 116 is rigidly connected to spindle 90, a pair of O-rings 154 and 156 are located in circumferential seats in spindle 90 on either side of groove 146 to provide a pneumatically tight seal between spindle 90 and sleeve 116. Sleeve 116 is metal as indicated in FIG. 3 and techniques for forming chromium oxide surfaces 150 and 152 in sleeve 116 are known to those skilled in the art. Air seals 140 and 142 can be American Variseals Air Seals, part number S67350-2002, Rev. B.

Figure 4:
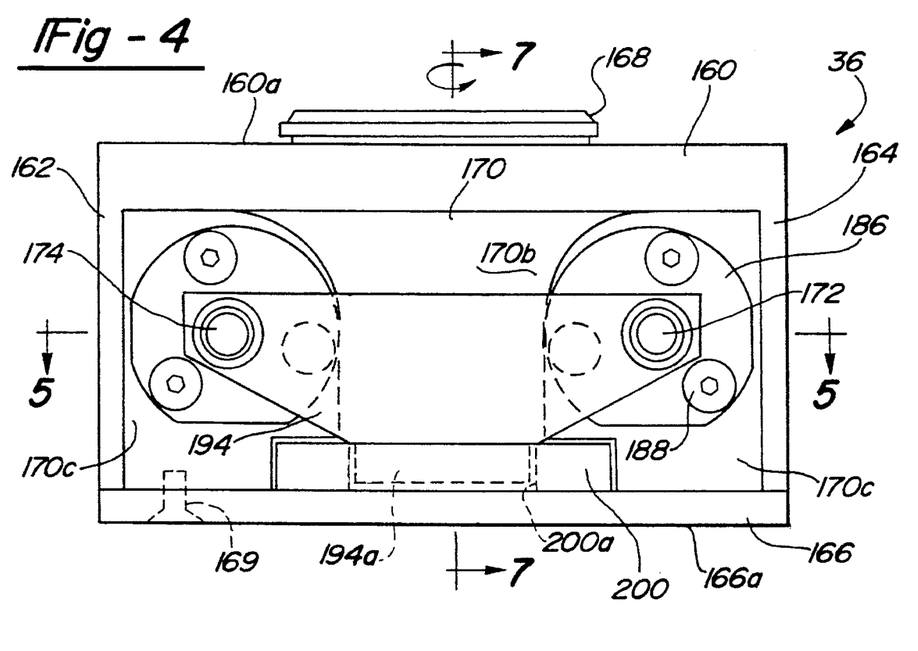
FIG. 4 is a side view of the cutting head used in the trim cutter of FIG. 1.
Figure 5:
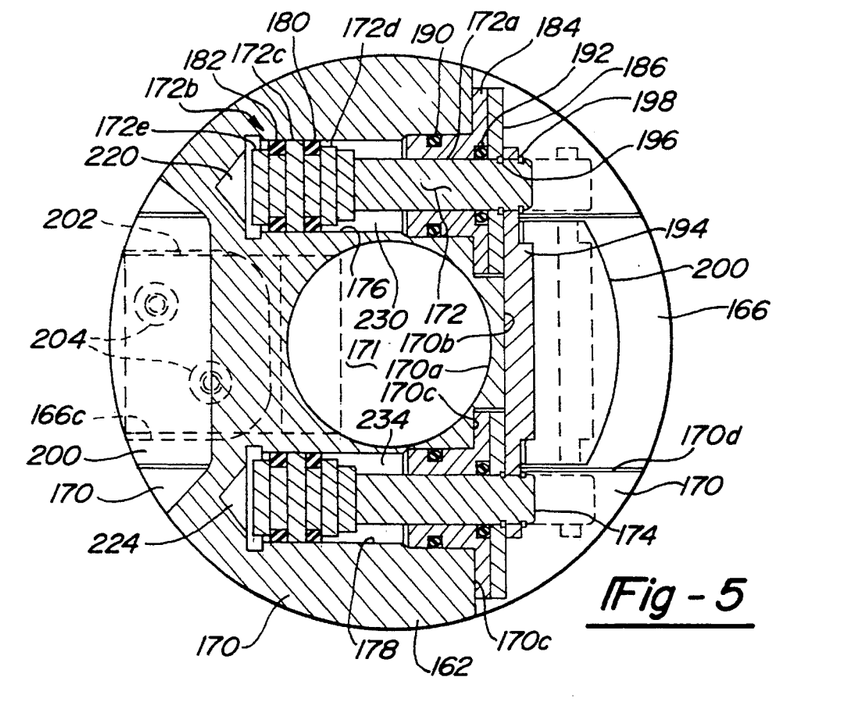
FIG. 5 is a cross-sectional view taken along the 5—5 line of FIG. 4 and rotated ninety degrees.

The construction and operation of cutting head 36 will now be described in connection with FIGS. 4 through 7. As shown in FIG. 4, the outer margins 0f cutting head 36 are defined primarily by an upper wall 160, a pair of sidewalls 162 and 164 unitary with upper wall 160, and a bottom plate 166. A raised rim 168 extends upwards from a top surface 160a of upper wall 160 and, when assembled onto spindle 90, fits into a recess 90e that is shown in FIG. 2. Cutting head 36 can then be bolted in place using screws (not shown) that are threaded into spindle 90. Thus, cutting head 36 will rotate about a vertical axis, as indicated by the directional arrow shown in FIG. 4. Bottom plate 166 has a lower surface 166a that defines the lower extent of cutting head 36. Cutting head 36 includes a stem 170 having a cylindrical passage 170a that in part defines a central passage 171 through cutting head 36. It is through this passage that excess material is drawn by vacuum system 24. Bottom plate 166 is attached to stem 170 using screws 169, one of which is shown in hidden lines in FIG. 4. Stem 170 has a stepped front surface, which is somewhat of an arbitrary designation given that cutting head 36 is generally cylindrical. As best seen in FIGS. 4 and 5, the stepped front surface includes a central front surface 170b and a recessed front surface 170c on either side of surface 170b. Thus, recessed front surface 170c defines the forward extent of sidewalls 162 and 164. As will be apparent from FIGS. 4, 5, and 7, upper wall 160, sidewalls 162 and 164, rim 168, and stem 170 are all formed from a single block of metal milled as needed into the proper conformation.

Housed within stem 170 are a pair of air pistons 172 and 174. In general, pistons 172 and 174 are pneumatically driven to move a knife blade or cutter into and out of central passage 171, as will be described subsequently. Pistons 172 and 174 and housed in respective cylindrical bores or cylinders 176 and 178 made into stem 170 through recessed front surface 170c. Since the construction, mounting, and operation of piston 174 is the same as that of piston 172, it will be understood that the following description, while referring specifically to piston 172, applies equally well to piston 174. Piston 172 includes a cylindrical extension 172a at one end and a piston section 172b at the other end. Piston section 172b includes an annular wall 172c having an outside diameter that is slightly less than the inside diameter of cylinder 176. Spaced on either side of annular wall 172c are a pair of annular walls 172d and 172e, both of which have an outer diameter that is somewhat less that than of wall 172c and each of which define a seat for one of two pneumatic U-packing seals 180 and 182. Extension 172a of piston 172 is supported by a cylindrical end seal 184 which is held in place with a retaining plate 186 that is bolted to stem 170 by flat-head machine screws 188. An air-tight seal is provided between cylindrical end seal 184 and cylinder 176 by an O-ring 190 and between end seal 184 and piston 172 by a third pneumatic U-packing seal 192.

Figure 7:
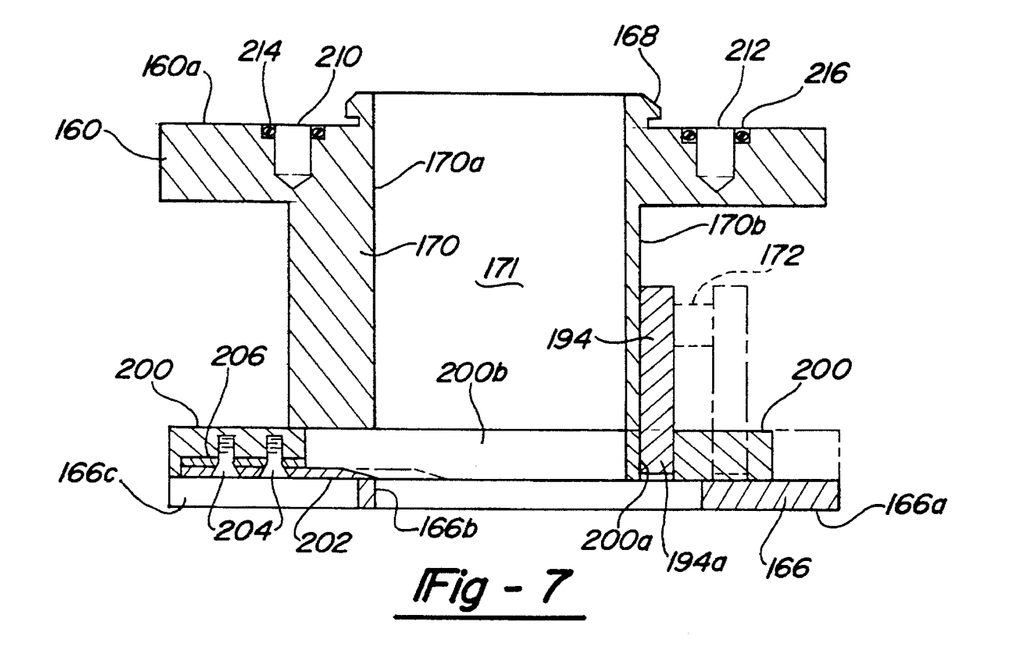
FIG. 7 is a cross-sectional view taken along the 7—7 lines of FIGS. 4 and 6.

Piston 172 is attached to one end of a connecting plate 194 using a pair of snap or retaining rings 196 and 198 on either side of plate 194. Connecting plate 194 is attached at its other end to piston 174, again using retaining rings. Connecting plate 194 angles downward to a lower portion 194a that fits into a slot 200a of a cutter mounting plate 200. This can be best seen in FIGS. 4 and 7. Cutter mounting plate 200 is supported by bottom plate 166 and fits within a wide channel 170d formed in the bottom of stem 170. Referring particularly to FIG. 7, bottom plate 166 and mounting plate 200 have respective rounded-rectangular openings 166b and 200b so that they do not interfere with movement of the head of a blow molded article up into central passage 171. Plate 200 also includes a recessed section 200c within which a knife blade or cutter 202 is attached using a pair of countersunk machine screws 204. Access to screws 204 is provided by a cutout portion 166c in bottom plate 166. An aluminum shim 206 can be placed between cutter 202 and plate 200 to permit fine adjustments of the vertical position of cutter 202 with respect to cutting head 36.

Figure 6:
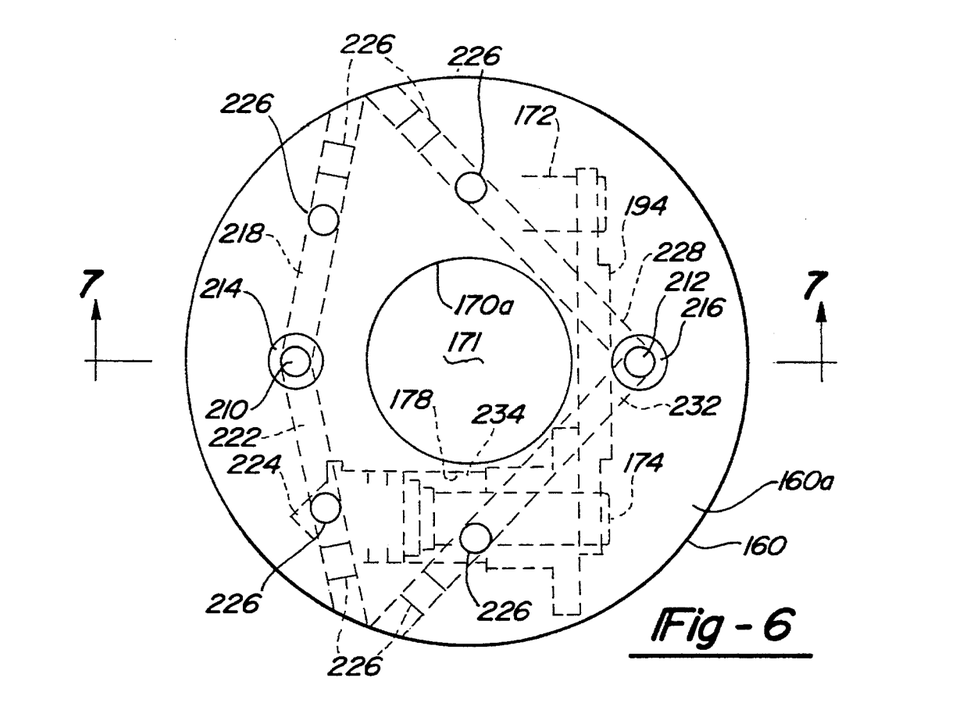
FIG. 6 is a top view of the cutting head of FIG. 5.

Air pistons 172 and 174 are pneumatically activated using compressed air fed from internal passages 106 and 108 of spindle 90. To supply the air from these passages, cutting head 36 uses a pair of pneumatic lines in the form of internal passages bored into upper wall 160 and stem 170 that terminate in air cavities defined between the air pistons and cylinder walls within which they lie. In particular and as shown in FIGS. 6 and 7, cutting head 36 includes a pair of pneumatic input ports 210 and 212. When cutting head 36 is assembled onto spindle 90, input ports 210 and 212 mate with the outlet of internal passages 106 and 108, respectively, of spindle 90. An O-ring 214 and 216 is seated about each of the input ports 210 and 212, respectively, to provide an air-tight seal when cutting head 36 is bolted onto spindle 90.

Since air pistons 172 and 174 are to extend and retract in unison, each input port 210, 212 is coupled to each of these pistons so that compressed air entering either input port is provided to both of the pistons. More specifically, input port 210 opens into two internal passages: a first passage 218 that provides the compressed air to a first conical air space 220 defined between piston section 172b of piston 172 and the innermost conical wall of cylinder 176; and a second passage 222 that provides the compressed air to a second conical air space 224 defined in the same way at the interior end of piston 174 and cylinder 178. Each of these internal passages extend through upper wall 160 in a direction parallel to top surface 160a and then extend perpendicularly down through stem 170 until they open into the conical air space within their respective cylinder. Since the passages are formed by drilling, plugs 226 are used to seal the access holes resulting from the drilling process. Similarly, input port 212 opens into two internal passages: a first passage 228 that provides the compressed air to a first cylindrical air space 230 defined between the extension 172a of piston 172 and the cylindrical side wall of cylinder 176; and a second passage 232 that provides the compressed air to a second cylindrical air space 234 defined in the same way in the middle portion of piston 174 and cylinder 178.

As will be appreciated by those skilled in the art, compressed air entering input port 210 from internal passage 106 of spindle 90 is fed simultaneously to air spaces 220 and 224 and therefore provides a force tending to push pistons 172 and 174 out of cylinders 176 and 178, respectively. On the other hand, compressed air entering input port 212 from internal passage 108 of spindle 90 is fed to air spaces 230 and 234 and therefore provides a force tending to push pistons 172 and 174 further into cylinders 176 and 178, respectively. In this way, pneumatic valves 112 and 114 can be used to reciprocate pistons 172 and 174 between a retracted and an extended position, with valve 112 being used to move the pistons away from the innermost end of their cylinders (i.e., from the retracted position to the extended position) and valve 114 being used to move the pistons back toward the innermost end (i.e., from the extended position to the retracted position).

Air pistons 172 and 174, connecting plate 194, cutter mounting plate 200, and cutter 202 are all shown in the retracted (non-cutting) position. As can be seen in FIGS. 5 and 7, extension of pistons 172 and 174 from the retracted position to the extended position that is shown in broken lines forces connecting plate 194 to move radially outward and away from central front surface 170b. Since lower portion 194a of plate 194 extends into slot 200a of plate 200, this movement causes plate 200 to slide along channel 170d, resulting in cutter 202 moving into central passage 171. In this way pistons 172 and 174 can be used to bring cutter 202 into contact with the neck of a blow-molded article located within central passage 171 while cutting head 36 is rotating. The combination of the cutting head rotating and the cutter being brought into contact with the neck of a stationary blow molded article results in the cutter slicing into the article as the cutter is being rotated around the neck of the article. In this way, cutter 202 can slice through the neck over the course of one or more revolutions of cutting head 36 about the article.

Figure 8:
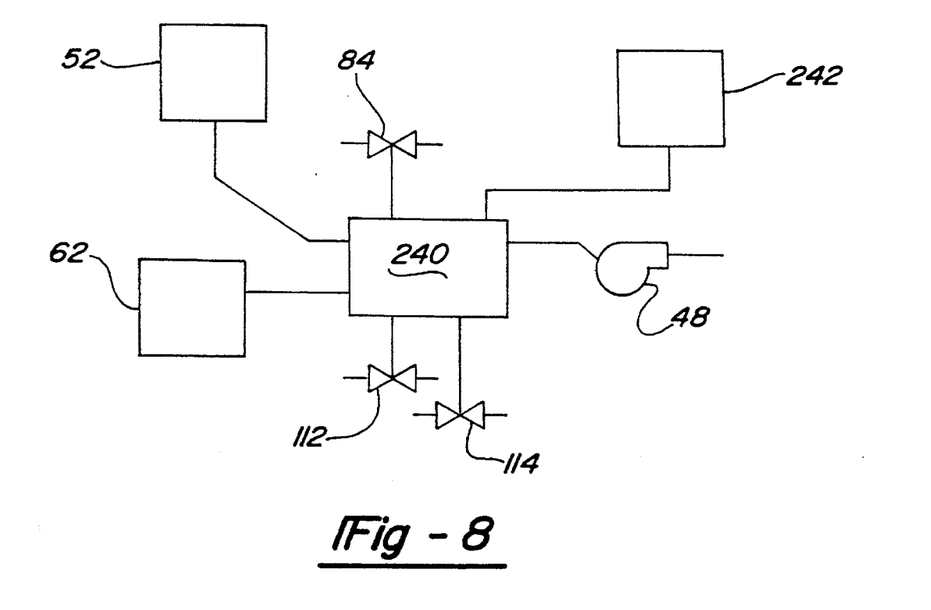
FIG. 8 is a diagram of the central control unit of the trimming apparatus showing the spindle drive motor, pneumatic valves, reversible drive, low pressure source, and an input device.

Referring now to FIG. 8, spindle drive motor 52, reversible drive 62, pneumatic valves 84, 86, 112, and 114, and low pressure source 48 are all operated under control of a central control unit (CCU) 240. CCU 240 is preferably microprocessor based and runs under control of a program to operate motor 52, drive 62, valves 84, 86, 112, and 114, and low pressure source 48 as needed to run trimming machine 10 according to the routine described above. Interface and drive circuits needed by CCU 240 to operate these devices are well known to those skilled in the art and no further elaboration here is necessary. CCU 240 receives input via a control panel, keyboard, or other device, generally indicated at 242. This input can be as simple as instructing the microprocessor to begin execution of its operating program.

CCU 240 can operate in conjunction with the sensors or control circuit of a conventional shuttle conveyor so that operation of trimming machine 10 is timed with that of the shuttle conveyor. Operation of the devices attached to CCU 240 is as follows. Initially, low pressure source 48, spindle drive motor 52, and drive 62 are operated and continue being run throughout the process. Once a bottle or other blow molded article requiring trimming is moved into place under cutting head 36, rotation of cam plate 68 causes cutting head 36 to be lowered over the blow molded bottle such that cutter 202 is aligned with the top of the neck. The precise positioning of cutter 202 with respect to the blow molded articles can be determined as a part of the initial machine set up. Then, CCU 240 activates valve 112 while maintaining valve 114 closed to bring cutter 202 into contact with the neck of the bottle. After approximately three revolutions, the head of the bottle will have been completely cut from the bottle's neck and CCU 240 therefore closes valve 112 and opens valve 114 to retract cutter 202 from within central passage 171. Thereafter, further rotation of cam plate 68 causes cutting head 36 to rise up and away from the bottle so that it can be moved for further processing and so that the next untrimmed bottle can be shuttled into position. Thereafter, the process repeats. As will be appreciated, CCU 240 can be implemented using a general purpose computer and the requisite programming of CCU 240 is well within the level of skill in the art.

It will thus be apparent that there has been provided in accordance with the present invention a trim cutter method and apparatus for blow molded articles which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, air pistons 172 and 174 could be biased into either their extended or retracted positions by springs or other means. Moreover, other means for moving cutter 202 between its retracted and extended positions can be used, including electrically activated (solenoid) mechanisms, centrifugal mechanisms, and others. Also, a second spindle and cutting head can be mounted on carriage 14 and driven using motor 52 to double the processing speed of trimming machine 10. All such variations and modifications are intended to come within the scope of the appended claims.

We claim:

1. An apparatus for cutting excess material from a cylindrical end of a blow-molded article, comprising:

a fixture;

a cylindrical spindle rotatably mounted to said fixture for rotation about an axis, said spindle having first and second axial ends and a central bore extending through said spindle from openings at said first and second ends;

a cutting head having proximal and distal axial ends with said proximal end-rigidly connected to said second end of said spindle whereby said cutting head rotates with said spindle about said axis, said cutting head having a central passage open to said central bore of said spindle at said proximal end and terminating in a distal opening at said distal end;

a cutter mounted on said cutting head and supported for movement between a retracted position and an extended position in which said cutter extends into said central passage; and a low pressure source coupled to said first end of said spindle to draw air through said central passage of said cutting head and said central bore of said spindle.

2. An apparatus as defined in claim 1, further comprising one or more air pistons mounted on said cutting head and connected to said cutter, wherein:

said cutting head has first and second pneumatic lines extending from respective first and second input ports to said one or more air pistons;

said spindle includes first and second internal passages aligned with said first and second input ports, respectively, and respective first and second circumferential grooves in fluidic communication with said first and second internal passages, respectively; and said fixture has first and second pneumatic feeds aligned with said first and second grooves, respectively, to provide pressurized fluid to said one or more air pistons.

3. An apparatus as defined in claim 2, further comprising a control circuit and first and second electrically operated pneumatic valves connected by respective first and second conduits to said first and second pneumatic feeds, respectively, said control circuit being operable to selectively and independently activate said pneumatic valves to provide pressurized fluid to said one or more air pistons.

4. An apparatus as defined in claim 2, wherein said pneumatic lines comprise internal passages in said cutting head.

5. An apparatus as defined in claim 2, further comprising first and second rotational pneumatic couplings located between said first and second pneumatic feeds, respectively, and said first and second grooves, respectively, wherein said pneumatic couplings comprise a sleeve mounted over said spindle and having a first aperture aligned with said first pneumatic feed and said first circumferential groove and a second aperture aligned with said second pneumatic feed and said second circumferential groove.

6. An apparatus as defined in claim 5, wherein:

said sleeve includes a first pair of chromium oxide circumferential surfaces located on opposite sides of said first aperture and a second pair of chromium oxide circumferential surfaces located on opposite sides of said second aperture;

said first pneumatic coupling has a first pair of seals, each of which is in contact with one of said first pair of surfaces; and said second pneumatic coupling has a second pair of seals, each of which is in contact with one of said second pair of surfaces.

7. An apparatus as defined in claim 1, further comprising:

a frame;

a spindle drive motor coupled to said spindle;

a carriage supporting said fixture and said drive motor; and a pneumatically driven air cylinder connected between said frame and said carriage.

8. An apparatus as defined in claim 7, further comprising means for vertically moving said carriage between an upper and lower position.

* * * * *